US008564630B2

(12) United States Patent  
Cui et al.

(10) Patent No.: US 8,564,630 B2
(45) Date of Patent: Oct. 22, 2013

(54) DISPLAYING WIDGET ELEMENTS BASED ON DISPLAY DEVICE RESOLUTION

(75) Inventors: Jun Tao Cui, Shanghai (CN); Gu Yi He, Shanghai (CN); Wei Huang, Shanghai (CN); Xiao Wen Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 13/154,582

(22) Filed: Jun. 7, 2011

(65) Prior Publication Data
US 2012/0081390 A1    Apr. 5, 2012

(30) Foreign Application Priority Data

Sep. 30, 2010 (CN) .......................... 2010 1 0506436

(51) Int. Cl.
*G09G 5/02* (2006.01)
(52) U.S. Cl.
USPC ........................... 345/698; 715/765; 715/762
(58) Field of Classification Search
None
See application file for complete search history.

(56) References Cited

U.S. PATENT DOCUMENTS

| 8,266,522 B2* | 9/2012 | Dugonjic et al. ............. 715/234 |
| 2004/0001041 A1* | 1/2004 | Chang et al. .................. 345/156 |
| 2004/0189670 A1* | 9/2004 | Govindan et al. ............. 345/619 |
| 2006/0067654 A1* | 3/2006 | Herberger et al. ............ 386/120 |
| 2007/0033116 A1* | 2/2007 | Murray .......................... 705/31 |

OTHER PUBLICATIONS

Gupta et al., "DOM-based Content Extraction of HTML Documents," Columbia University, Proceedings of the 12th international conference on World Wide Web, 2003.
Lection et al., "Method and Process for Managing Larger GUI Panels on Smaller Pervasive Devices," IBM Technical Disclosure Bulletin, IP.com No. IPCOM000014415D, International Business Machines Corporation, Dec. 1, 1999.

* cited by examiner

Primary Examiner — James A Thompson
Assistant Examiner — David H Chu
(74) Attorney, Agent, or Firm — VanLeeuwen & VanLeeuwen; Libby Z. Toub

(57) ABSTRACT

Displaying a web page on a display device is accomplished by receiving resolution information corresponding to a resolution of the display device, receiving a resolution threshold for displaying a widget element on the web page, and determining whether the resolution of the display device is less than the resolution threshold for displaying the widget element. If the resolution of the display device is not less than the resolution threshold for displaying the widget element, the widget element is displayed on the web page, wherein the web page is displayed on the display device. If the resolution of the display device is smaller than the resolution threshold for displaying the widget element, the widget element is not displayed on the web page.

6 Claims, 3 Drawing Sheets

DISPLAYING WIDGET ELEMENTS BASED ON DISPLAY DEVICE RESOLUTION

RELATED APPLICATIONS

This application is based on and claims the benefit of priority from Chinese Patent Application 201010506436.X, filed Sep. 30, 2010.

BACKGROUND

A web page is one of the most important user interfaces nowadays. Users can easily access and browse web pages with browsers hosted on PCs, mobile computers, or embedded devices. However, different display devices have different resolutions, which may require web pages to be flexible enough to support these devices having different resolutions.

Currently, there are several approaches to adapt a web page for different resolutions. One approach is to make the web page stretchable. Unfortunately, the stretch may be limited. A well displayed web page on a PC may be unreadable when it is shown on a mobile device. Another approach is to prepare different sets of web pages for devices having different resolutions. This approach can be used along with the first approach so as to increase its adaptability and reduce workload for developing web pages. However, it may be difficult to cover all resolutions, and may significantly increase workload and time for developing web pages. Another approach is to zoom in or out the web page, however, this could cause the readability of the web page to be poor.

SUMMARY

One embodiment of the invention is a method for displaying a web page on a display device by receiving resolution information corresponding to a resolution of the display device, receiving a resolution threshold for displaying a widget element on the web page, and determining whether the resolution of the display device is less than the resolution threshold for displaying the widget element. If the resolution of the display device is not less than the resolution threshold for displaying the widget element, the widget element is displayed on the web page, wherein the web page is displayed on the display device. If the resolution of the display device is smaller than the resolution threshold for displaying the widget element, the widget element is not displayed on the web page.

Another embodiment of the invention is a system for automatically creating a progression plan for a software test, the system including components for carrying out the methods described above.

Another embodiment of the invention is a computer program product including programming code instructions for executing the steps of the method described above when the program is executed on a computer.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In one embodiment, a widget is a visual unit for constructing a graphic user interface (GUI). A widget is re-useable, and is used to encapsulate specific data and provide presentation and flexible interactive manipulation. A widget has a unique lifetime (including from its creation to destruction), and performs self-management on the premise that it follows overall page layout. A widget generally comprises a plurality of page elements having common characteristics, and these page elements constituting the widget are referred to as widget elements. Widgets may also co-operate to implement more complicated features.

Figure 1:
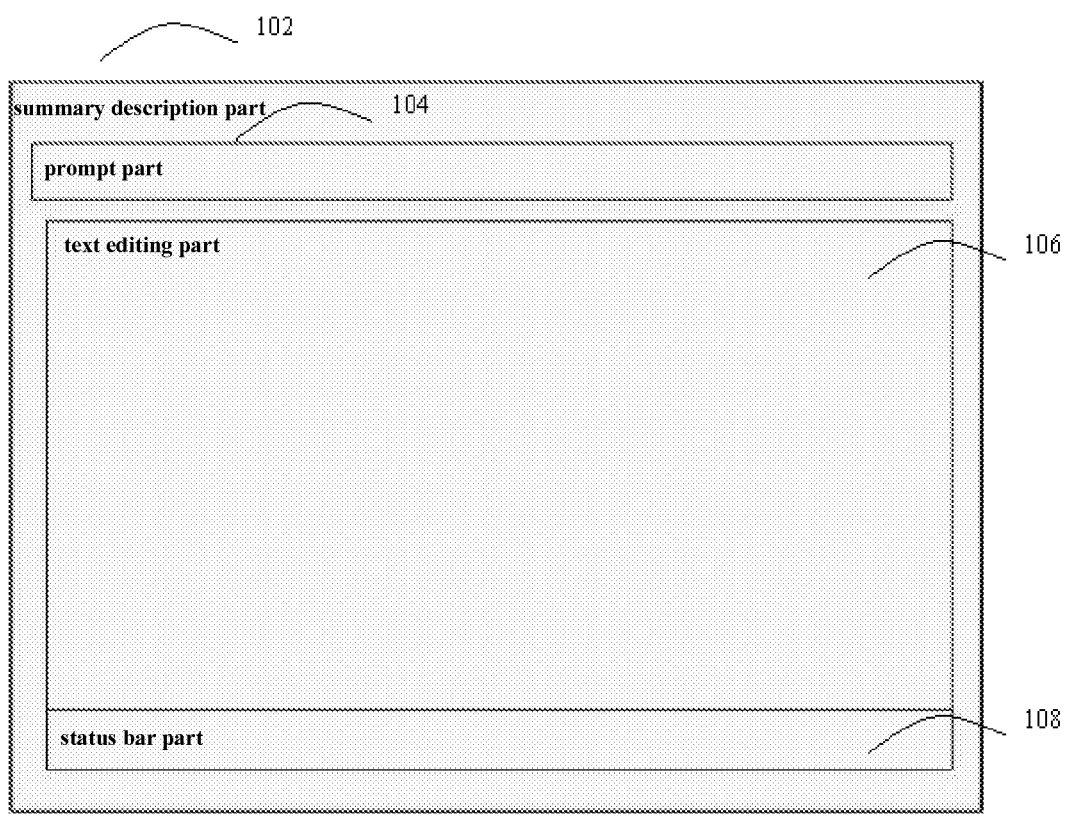
FIG. 1 illustrates an example of a widget according to an embodiment of the invention.

FIG. 1 illustrates an example of a widget 100 according to an embodiment of the invention. Widget 100 is a text editor widget. The widget 100 in FIG. 1 includes four elements, that is, summary description part 102, prompt part 104, text editing part 106 and status bar part 108.

Figure 2:
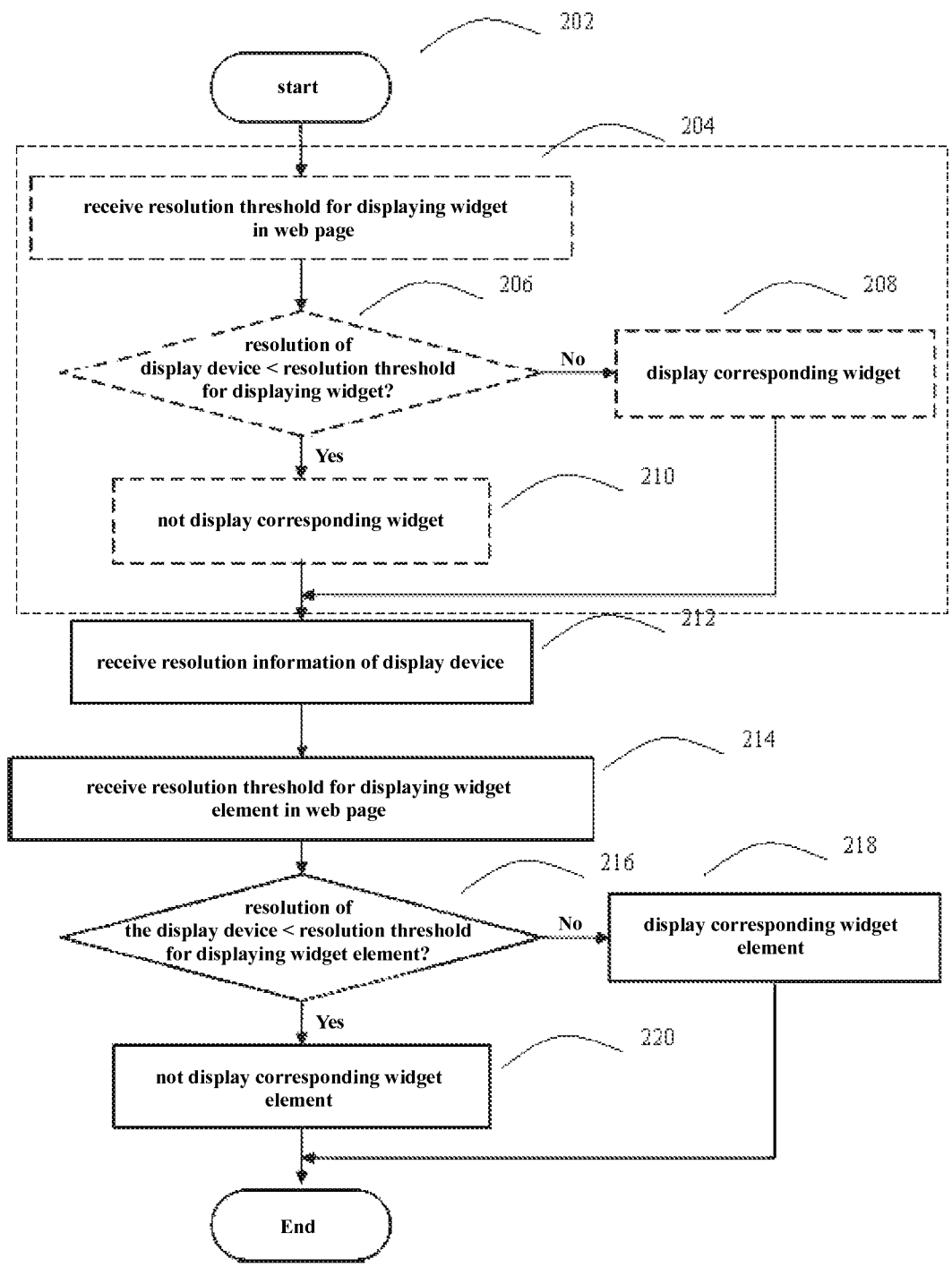
FIG. 2 illustrates a method for displaying a web page according to another embodiment of the invention.

A method for displaying a web page according to an embodiment of the invention will described in detail in conjunction with FIG. 2.

Referring to FIG. 2, the method 200 for displaying a web page according to an embodiment of the invention starts from step 202. Note that the steps shown in the dashed line box are described later in the description below. In one embodiment, the steps shown in the dashed line box are optional.

In step 212, resolution information of a display device is received to determine resolution of the display device. Different types of display devices may support different resolutions. For example, PC and notebook computers generally will support high resolution, such as 1024×768, 1200×1024, or higher. Mobile devices generally support lower resolution due to limitation in display screen size, such as 640×480, 320×240, or even lower. Resolution information of the display device includes information regarding the resolution that is currently used by the display device.

Then, the method proceeds to step 214, where a resolution threshold for displaying a widget element in the web page is received. Taking the widget 100 in FIG. 1 for example, the resolution threshold for displaying a widget element corresponds to a resolution threshold that determines whether a respective widget element (i.e. summary description part 102, prompt part 104, text editing part 106 and status bar part 108) is displayed. If the resolution of the display device is not smaller than the resolution threshold for displaying a certain widget element, that widget element will be displayed, and if the resolution of the display device is smaller than the resolution threshold for displaying a certain widget element, that widget element will not be displayed. Table 1 gives an example of the resolution threshold for displaying a widget element corresponding to widget 100 of FIG. 1.

TABLE 1

| Widget element | Resolution threshold |
| --- | --- |
| summary description part | 640 × 480 |
| prompt part | 1024 × 768 |
| text editing part | 0 |
| status bar part | 800 × 600 |

Taking Table 1 for example, the resolution threshold for displaying the summary description part is 640×480, which means that if the resolution of the display device is smaller than 640×480, the summary description part will not be displayed, and if the resolution of the display device is not smaller than 640×480, the summary description part will be displayed. The resolution threshold for displaying the text editing part is '0', which means that the widget element will be displayed regardless of the resolution of the display device. If there are multiple widgets in a web page, then for each widget, there is a corresponding resolution threshold for displaying the widget elements as shown in Table 1.

Next, the method proceeds to step 216. It is determined whether the resolution of the display device is smaller than the resolution threshold for displaying a widget element. If the resolution of the display device is not smaller than the resolution threshold for displaying the widget element, the method proceeds to step 218, in which the corresponding widget element is displayed. If the resolution of the display device is smaller than the resolution threshold for displaying a widget element, the method proceeds to step 220, in which the corresponding widget element is not displayed.

TABLE 2

| Resolution threshold for displaying widget in web page | |
| --- | --- |
| Widget | Resolution threshold |
| welcome information | 800 × 600 |
| text editor | 0 |
| submit button | 0 |
| navigate bar | 320 × 240 |

If there are multiple widgets in a web page, then for each widget, there is a resolution threshold for displaying the widget. See the above example of Table 2.

Table 2 gives an example of corresponding resolution thresholds for displaying widgets when there are multiple widgets in a web page. In this example, there are four widgets in the web page, that is, welcome information, text editor, submit button and navigate bar. If the resolution of the display device is not smaller than the resolution threshold for displaying a certain widget, the widget will be displayed, and if the resolution of the display device is smaller than the resolution threshold for displaying a certain widget, the widget will not be displayed. Taking Table 2 for example, the resolution value for displaying welcome information is 800×600. This means that if the resolution of the display device is smaller than 800×600, the welcome information will not be displayed, and if the resolution of the display device is not smaller than 800×600, the welcome information will be displayed. The resolution thresholds for displaying text editor and displaying submit button are '0', which means that the widgets will be displayed regardless of the resolution of the display device. Taking resolution threshold 800×600 for example, a resolution smaller than the resolution threshold may mean that the horizontal resolving power is smaller than 800, or the vertical resolving power is smaller than 600, or the horizontal and vertical resolving power are smaller than 800 and 600 respectively, or the total number of pixels is smaller than 800×600.

The method for displaying a web page according to another embodiment of the invention further includes the steps in the dashed line box, in which a resolution threshold for displaying a widget in the web page is received in step 204. As described above, if the resolution of the display device is not smaller than the resolution threshold for displaying a certain widget, the widget will be displayed. If the resolution of the display device is smaller than the resolution threshold for displaying a certain widget, the widget will not be displayed.

Then, the method proceeds to step 206, where it is determined whether the resolution of the display device is smaller than the resolution threshold for displaying a widget. If the resolution of the display device is not smaller than the resolution threshold for displaying the widget, the method proceeds to step 208, in which the corresponding widget is displayed. If the resolution of the display device is smaller than the resolution threshold for displaying the widget, the method proceeds to step 210, in which the corresponding widget is not displayed.

Although the description herein illustrates performing the steps in dashed line box (i.e., step 202 to step 210) first and then performing step 212 to step 220 for example, the invention is not limited thereto. It is also possible to perform step 212 to step 220 first, and then perform the parts in dashed line box (i.e., step 202 to step 210).

As shown in Table 1 and Table 2, the resolution threshold for displaying a widget element might not match with the resolution threshold for displaying a widget, that is, values of resolution thresholds are different. When the resolution threshold for displaying a widget element does not match with the resolution threshold for displaying a widget, the method for displaying a web page according to another embodiment of the invention further includes receiving a mapping between the resolution threshold for displaying a widget element and the resolution threshold for displaying a widget, and further determining whether the widget element is displayed by using the mapping. The mapping may be set by a user in advance, or may be automatically set by a system. Taking Table 1 and Table 2 for example, a mapping as shown in Table 3 may be set.

TABLE 3

| Mapping between resolution threshold for displaying widget element and resolution threshold for displaying widget | |
| --- | --- |
| Resolution threshold for displaying widget | Resolution threshold for displaying widget element |
| 800 × 600 | 800 × 600 |

TABLE 3-continued

Mapping between resolution threshold for displaying widget element and resolution threshold for displaying widget

| Resolution threshold for displaying widget | Resolution threshold for displaying widget element |
|---|---|
| 0 | 0 |
| 320 × 240 | 640 × 480 |

By using the mapping shown in Table 3, it can be derived that the resolution threshold 320×240 for displaying a widget is mapped to the resolution threshold 640×480 for displaying a widget element, that is, when the resolution of the display device is smaller than 320×240, all the widget elements whose resolution thresholds are 640×480 will not be displayed.

The method for displaying a web page according to an embodiment of the invention is described above in detail in conjunction with FIG. 2. A system 300 for displaying a web page according to another embodiment of the invention will be described below in detail in conjunction with FIG. 3.

Figure 3:
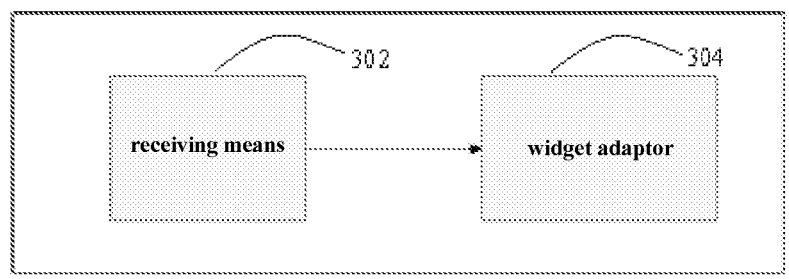
FIG. 3 illustrates a system for displaying a web page according to another embodiment of the invention.

As shown in FIG. 3, according to another embodiment of the invention, the system 300 for displaying a web page includes receiving means 302 configured to receive resolution information of a display device in order to determine resolution of the display device and receive resolution threshold for displaying a widget element in the web page. System 300 also includes widget adaptor 304 configured to determine whether the resolution of the display device is smaller than the resolution threshold for displaying a widget element. If the resolution of the display device is not smaller than the resolution threshold for displaying a widget element, the corresponding widget element is displayed. If the resolution of the display device is smaller than the resolution threshold for displaying a widget element, the corresponding widget element is not displayed.

Alternatively, according to another embodiment of the invention, the receiving means 302 is further configured to receive a resolution threshold for displaying a widget in the web page. The widget adaptor 304 is further configured to determine whether the resolution of the display device is smaller than the resolution threshold for displaying a widget. If the resolution of the display device is not smaller than the resolution threshold for displaying a widget, the corresponding widget is displayed. If the resolution of the display device is smaller than the resolution threshold for displaying a widget, then the corresponding widget is not displayed.

The receiving means 302 is further configured to determine whether the resolution threshold for displaying a widget element matches with the resolution threshold for displaying a widget. If the resolution threshold for displaying a widget element does not match with the resolution threshold for displaying a widget, a mapping between the resolution threshold for displaying a widget element and the resolution threshold for displaying a widget is received. The widget adaptor 304 is further configured to determine whether the widget element is displayed by using the mapping.

The invention is described above in conjunction with detailed embodiments, however, it should be noted that, those of ordinary skill in the art will appreciate that all or any step or component of the method and apparatus of the invention may be implemented in any computing apparatus (including processor, storage medium, etc.) or network of computer apparatuses in hardware, firmware, software, or a combination thereof.

Thus, the invention may also be realized by running a program or a group of programs on any computing apparatus. The computing apparatus may be a known general purpose apparatus. Thus, the invention may also be realized by providing a program product containing program code for implementing the method or apparatus. That is, such program product also constitutes the invention, and the storage medium on which such program product is stored also constitutes the invention. The storage medium may be any known storage medium or any storage medium that will be developed in the future.

It should also be noted that, in the apparatus and method of the invention, each component or each step may be separated and/or recombined. Such separation and/or recombination should be considered as an equivalent solution of the invention. Further, the steps for performing the above series of processes may be executed according to the sequence of description in time sequence, but does not necessarily need to be executed in time sequence. Some steps may be executed in parallel or independent to each other.

Although the invention and advantages thereof have been described in detail, it should be appreciated that various modifications, substitutions and alternations may be made without departing from the spirit and scope of the invention defined by the appended claims. Further, the term "comprising", "including" herein or any other variations thereof is intended to cover nonexclusive inclusion, such that procedure, method, item or apparatus that comprise a series of elements not only includes those elements, but also includes other elements that are not listed explicitly, or includes elements that are inherent to such procedure, method, item or apparatus. Without more definition, the element defined by the phrase "including a . . . " does not exclude existence of other same elements in the procedure, method, item or apparatus that comprise that element.

The invention claimed is:

1. A method for displaying a web page on a display device, comprising:
    receiving resolution information corresponding to a resolution of the display device;
    receiving a resolution threshold for displaying a widget on the web page;
    receiving a resolution threshold for displaying a widget element on the web page;
    determining whether the resolution of the display device is less than the resolution threshold for displaying the widget;
    if the resolution of the display device is not less than the resolution threshold for displaying the widget, displaying the widget on the web page, wherein the web page is displayed on the display device;
    if the resolution of the display device is less than the resolution threshold for displaying the widget, not displaying the widget on the web page;
    determining whether the resolution threshold for displaying the widget element matches with the resolution threshold for displaying the widget;
    if the resolution threshold for displaying the widget element does not match with the resolution threshold for displaying the widget, receiving a mapping between the resolution threshold for displaying the widget element and the resolution threshold for displaying the widget; and
    determining whether the widget element is displayed by using the received mapping.

2. The method according to claim 1, wherein the resolution information corresponding to the display device comprises a resolution that is currently used by the display device.

3. A system for displaying a web page, comprising:
receiving means configured to:
- receive resolution information corresponding to a resolution of a display device;
- receive resolution threshold for displaying a widget on the web page; and
- receive a resolution threshold for displaying a widget element on the web page; and a widget adaptor configured to:
- determine whether the resolution of the display device is less than the resolution threshold for displaying the widget;
- if the resolution of the display device is not less than the resolution threshold for displaying the widget, display the widget on the web page, wherein the web page is displayed on the display device;
- if the resolution of the display device is less than the resolution threshold for displaying the widget, not display the widget on the web page;
- determine whether the resolution threshold for displaying the widget element matches with the resolution threshold for displaying the widget;
- if the resolution threshold for displaying the widget element does not match with the resolution threshold for displaying the widget, receive a mapping between the resolution threshold for displaying the widget element and the resolution threshold for displaying the widget; and
- determine whether the widget element is displayed by using the received mapping.

4. The system according to claim 3, wherein the resolution information corresponding to the display device comprises a resolution that is currently used by the display device.

5. A computer program product for displaying a web page on a display device, the computer program product comprising:

a computer readable storage device;
first program instructions to receive resolution information corresponding to a resolution of the display device;
second program instructions to receive a resolution threshold for displaying a widget on the web page;
third program instructions to receive a resolution threshold for displaying a widget element on the web page;
fourth program instructions to determine whether the resolution of the display device is less than the resolution threshold for displaying the widget;
fifth program instructions to display the widget on the web page if the resolution of the display device is not less than the resolution threshold for displaying the widget, wherein the web page is displayed on the display device;
sixth program instructions to not display the widget element on the web page if the resolution of the display device is less than the resolution threshold for displaying the widget element;
seventh program instructions to determine whether the resolution threshold for displaying the widget element matches with the resolution threshold for displaying the widget;
eighth program instructions to receive a mapping between the resolution threshold for displaying the widget element and the resolution threshold for displaying the widget if the resolution threshold for displaying the widget element does not match with the resolution threshold for displaying the widget; and
ninth program instruction to determine whether the widget element is displayed by using the received mapping; and
wherein the first, second, third, fourth, fifth, sixth, seventh, eighth, and ninth program instructions are stored on the computer readable storage device.

6. The computer program product according to claim 5, wherein the resolution information corresponding to the display device comprises a resolution that is currently used by the display device.

* * * * *